Figure 1:
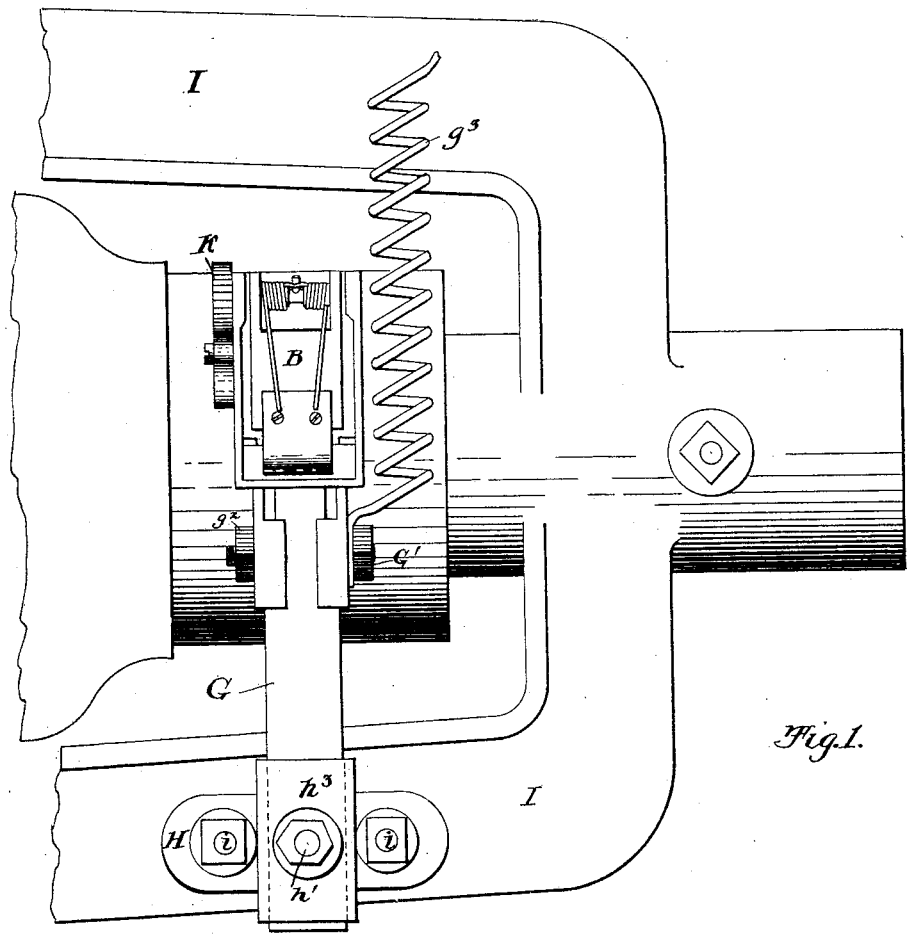

(No Model.) 4 Sheets—Sheet 1.
F. B. DAGGETT.
BRUSH HOLDER FOR DYNAMO ELECTRIC MACHINES AND MOTORS.

No. 476,368. Patented June 7, 1892.

Witnesses:
Jonathan Alley
G. M. Copenhaver.

Inventor
Frank B. Daggett
By John J. Halsted &
his Attorneys.

(No Model.) 4 Sheets—Sheet 2.

F. B. DAGGETT.
BRUSH HOLDER FOR DYNAMO ELECTRIC MACHINES AND MOTORS.

No. 476,368. Patented June 7, 1892.

Witnesses:

Inventor.
Frank B. Daggett
By John J. Halsted & Son
his Attorneys.

(No Model.) 4 Sheets—Sheet 3.
F. B. DAGGETT.
BRUSH HOLDER FOR DYNAMO ELECTRIC MACHINES AND MOTORS.

No. 476,368. Patented June 7, 1892.

Witnesses:
Jonathan Ailes
G. M. Copenhaver

Inventor,
Frank B. Daggett
By John J. Halsted & Son
his Attorneys.

(No Model.) 4 Sheets—Sheet 4.

F. B. DAGGETT.
BRUSH HOLDER FOR DYNAMO ELECTRIC MACHINES AND MOTORS.

No. 476,368. Patented June 7, 1892.

Witnesses:
Jonathan Allen
G. M. Copenhaver

Inventor,
Frank B. Daggett
By John J. Halsted & Son
his Attorneys.

THE NORRIS PETERS CO., PHOTO-LITHO., WASHINGTON, D. C.

UNITED STATES PATENT OFFICE.

FRANK B. DAGGETT, OF ST. JOSEPH, MISSOURI.

BRUSH-HOLDER FOR DYNAMO-ELECTRIC MACHINES AND MOTORS.

SPECIFICATION forming part of Letters Patent No. 476,368, dated June 7, 1892.

Application filed September 8, 1891. Serial No. 405,134. (No model.)

*To all whom it may concern:*

Be it known that I, FRANK B. DAGGETT, of the city of St. Joseph, in the county of Buchanan and State of Missouri, have invented certain new and useful Improvements in Electrical-Brush Holders; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to that class of devices for holding carbon brushes and automatically pressing the same against or preserving the same in contact with the opposite sides or poles of electrical commutators, whether stationary or movable.

The object of my invention is to provide a brush-holder applicable to all electric motors, and especially to motors employed and used on electrical-railway cars, and which will be automatic, simple, strong, and durable in construction, effective in preserving the insulation of the machinery from the commutator, easily regulated, and economical in use, and which may be readily and quickly applied to any form of commutator now in use.

Hitherto all carbon-brush holders in use have, so far as I know, been fastened around the commutator-shaft by the use of a rocker-arm, open collar, and set-screw. The distance between the metal holding the carbon and the nuts, bolts, and bands connecting the same with the commutator-shaft has necessarily been very short. Such holders so placed around the shaft of the commutator have been so near the earth, and the wooden rocker-arm being horizontal instead of vertical water, oil, and metal dust necessarily accumulate on the upper side of such rocker-arm and create a conducting medium to the great damage of the motor and derangement of the service. The tendency of the electric current in motors is at best very strong to arc over and ground; and one object of my invention is to produce a brush-holder that will obviate this tendency. Another fault with all carbon-brush holders now in use, so far as I know, is that, owing to their peculiar construction, they wear a deep groove in the end of the carbon brush opposite to the commutator, rendering that end useless, and, besides, but a small portion, usually not more than one-third of the brush, can be used, the use of the remainder being lost for the reason that it cannot be held against the commutator. In my novel device I remedy these defects so that as much as seven-eighths of the carbon brush can be utilized, and rubbing, grinding, or guttering of the brush are absolutely avoided.

Reference is to be had to the accompanying drawings, forming a part of this specification, in which similar letters of reference indicate corresponding parts in all the drawings.

Figure 2:
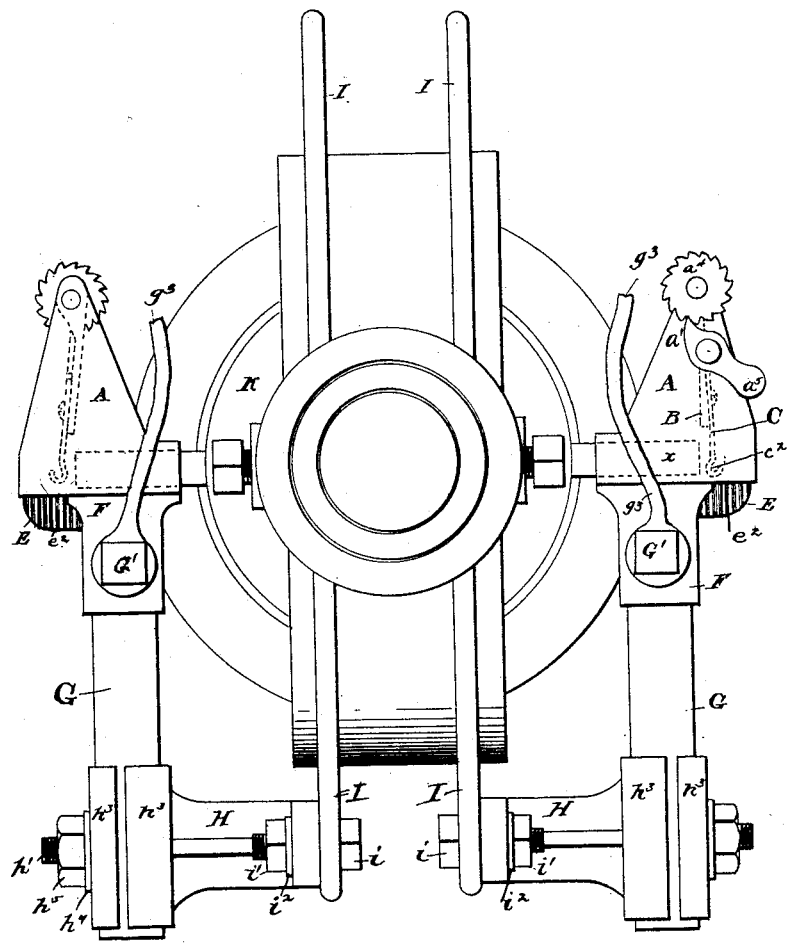
Figure 3:
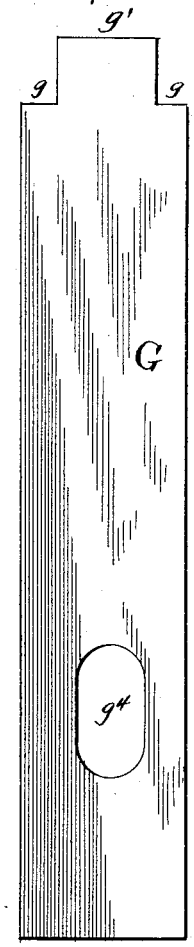
Figure 4:
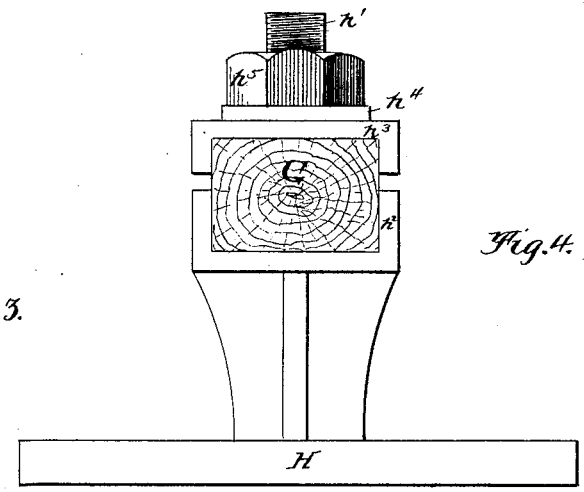
Figure 5:
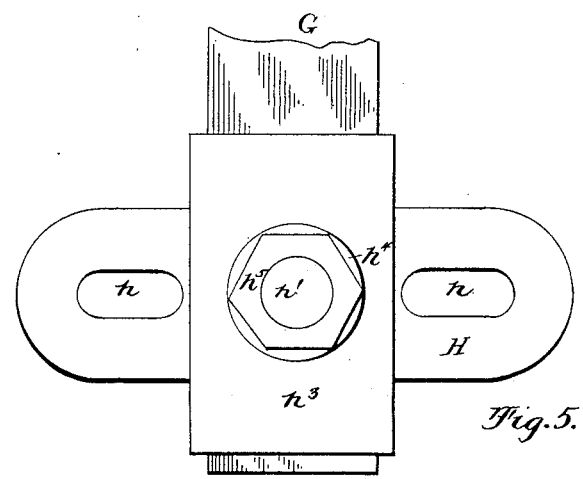
Figure 6:
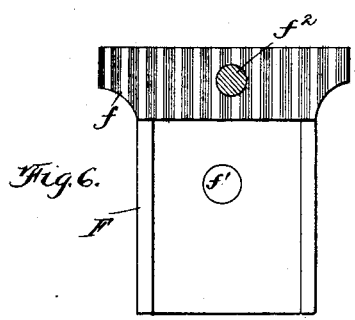
Figure 7:
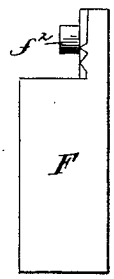
Figure 8:
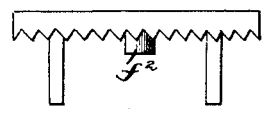
Figure 9:
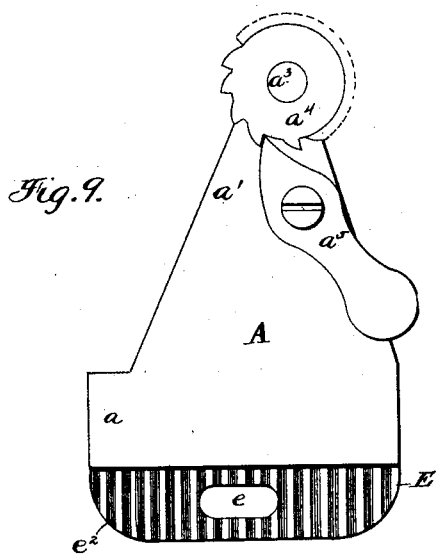
Figure 11:
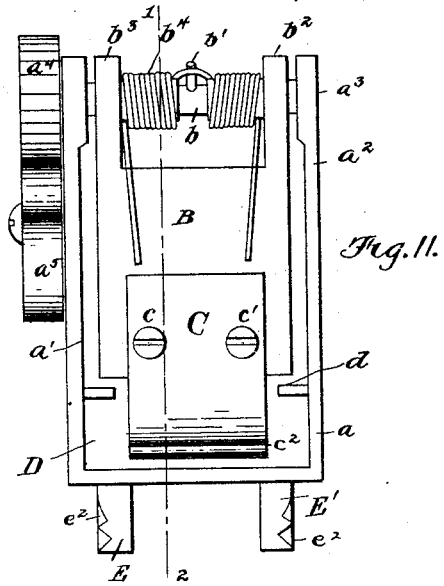
Figure 10:
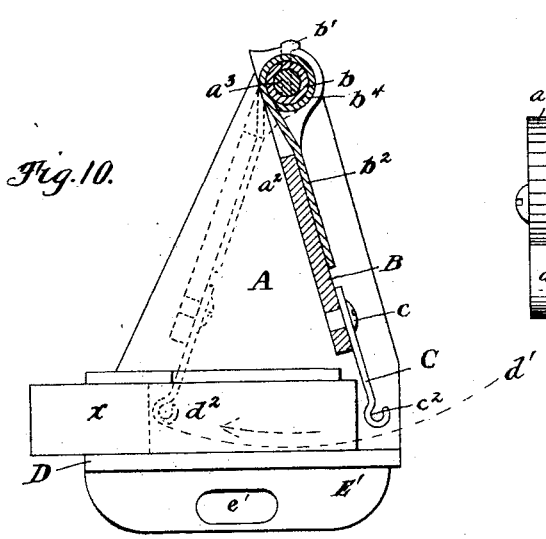
Figure 12:
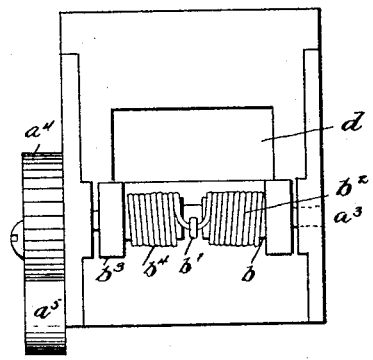

Figure 1 is a side view of a commutator as used on electric street-railway cars, showing a back view of one of my novel brush-holders in position and operation. This view, as also Fig. 2, serves to show the application to a commutator of my improved device, the commutator itself forming no part of the invention. Fig. 2 is an end view of the same commutator, showing two of my novel brush-holders in position on opposite sides thereof, giving a side view of my brush-holders. Fig. 3 is a side view, on a larger scale, of the wooden standard or insulator used in the brush-holder. Fig. 4 is a bottom and end view of the same, showing the bottom attachment. Fig. 5 is a back view of the same. Figs. 6, 7, and 8 are respectively an elevation, side view, and plan view, on an enlarged scale, of the outside corrugated clamp used in fastening to and connecting with the device for holding the carbon brush the wooden standard or insulator and showing said corrugated clamp from different points of view. Figs. 9 and 10 are opposite side views, enlarged, of the head of one of my novel brush-holders, Fig. 10 being partly in section through the line 1 2 of Fig. 11; and Figs. 11 and 12 are enlarged back and top views, respectively, of the head of one of my novel brush-holders, showing arrangement and action of the spring-tongue used to automatically hold the brush in contact with the commutator.

The invention consists of a triangular-shaped head or holder A, cast solid of brass or other suitable metal, but preferably of brass, the base $a$ of this head being flat and square and having two jaws $a'$ $a^2$, one on each side, and each of said jaws being at its bottom as wide as the base of the head A and narrowing to an apex at the top. Holes are provided through the apex of each of these jaws $a'$ $a^2$, and a bolt $a^3$ is passed through each of these holes. One end of this bolt $a^3$ is provided with a ratchet-wheel $a^4$, adapted to engage a dog $a^5$ or pawl, which is provided for that purpose and pivoted near its center to the outside of the jaw $a'$. A sleeve $b$, of brass or other suitable material, is passed over the bolt $a^3$ between the upright jaws $a'$ $a^2$ and fastened to said bolt by a pin $b'$, which is passed through both sleeve $b$ and bolt $a^3$. The upper end of this pin projects above the sleeve and is formed in the shape of a stud or catch to hold the center of the spiral spring hereinafter described. Between the upright jaws $a'$ $a^2$ a plate B is supended by means of ears $b^2$ $b^3$, projecting from the upper corners thereof. These ears are provided with openings and arranged so that said plate B is pivoted on said bar $a^3$ and revoluble thereon. An adjustable spiral spring $b^4$ is provided, its center being bent or looped around the pin or latch $b'$ above described, each of its arms being wound around the sleeve $b$ with the opposite ends projecting, so as to bear on the outside of the plate B. When the ratchet-wheel $a^4$ is not engaged with the pawl $a^5$, the bar $a^3$, on which it is fixed, the sleeve $b$, hanging plate B, and spring $b^4$ work freely and loosely and are revoluble on said bar. When the pawl $a^5$ is engaged with the teeth of the ratchet-wheel $a^4$, the wheel $a^4$ can be turned so as to wind up said spring $b^4$ to any tension desired. On the bottom of said swinging plate B a plate or tongue C, of brass, is fastened by means of screws $c$ $c'$, so that the same is detachable. The lower end of said tongue C is formed into a curve $c^2$, so that when pressed against the end of the carbon brush $x$ the contact of the tongue with the brush will be constantly and automatically in the center of the end of said brush, without regard to the position of the tongue C with reference to its pivotal ears $b^2$ $b^3$, thus avoiding grinding and guttering of the brush. The bottom of this holder A is provided with a brush-chamber D of an oblong shape, and so arranged that the tongue C is enabled to act throughout the greater portion of the length of said brush-chamber by means of a slot or opening $d$ cut out of the top thereof, the pressure of said tongue C being in the direction of the arrow and following the course of the dotted line $d'$ $d^2$ in Fig. 10. Under the bottom of said head A, with its mechanism as described, are provided two extensions E and E', having in their center slots $e$ $e'$, respectively, and constructed with deep corrugations $e^2$ on their outer sides. These extensions are cast with the head and are part of it. Two box-clamps F are provided, the upper parts $f$ of which are corrugated on their inner sides and adapted to mesh with the corrugations on E and E'. Said box-clamps F are provided with openings $f'$ and lugs $f^2$, (see Fig. 6,) adapted to work in the slots $e$ $e'$ and hold together the head A and box-clamps F. The lugs $f^2$ are slightly to one side of the center of said clamps F, so that the head A may, if necessary, be moved such distances in either direction as the length of the slots $e$ $e'$ may allow, and thus bring the brush-holder nearer the commutator, or vice versa; and said box-clamps F are reversible and interchangeable, and may be used on either side of said head A, the effect of such reversal being to double the space through which the head A may be moved in one direction by means of the slots $e$ $e'$ and lugs $f^2$.

Having described the mechanism of my brush-holder, I will now proceed to describe the devices by which I gain a maximum of insulation, and also the manner in and devices by which I attach my brush-holder to the motor.

G is an insulator, which is also a standard on which is fastened the head of my brush-holder. It is formed of hard maple or any other suitable material and before using is thoroughly boiled in paraffine, so that it will not retain water. It may be of any suitable dimensions, but preferably seven inches long and one inch by one and seven-sixteenth inches in size. At the top of this insulator are formed two shoulders $g$ $g$ in such manner that the neck $g'$ will fit snugly and closely between the slotted extensions E E', the shoulders $g$ $g$ abutting closely against the bottom of said slotted extensions. Through said insulator G a hole is made from side to side and in such position that when placed between box-clamps F said hole will be on a line with holes $f'$, formed in said box-clamps. A threaded bolt G' is passed through said holes, including hole $f'$, and securely and firmly fastened by a lock-nut $g^2$ and by a spring-lock washer like as is shown at $h^4$ in Figs. 2 and 4. A conducting or contact wire $g^3$ is formed into a loop and said loop passed around said bolt G between the head of said bolt G' and the box-clamp G, so that when the nut $g^2$ is screwed up the slotted extensions E E', the box-clamps F, the top of the insulator G, and the wire $g^3$ are bound firmly and rigidly together, forming a firm support to the head A and a perfect metal connection from the commutator through the brush, the head A, the slotted extensions E E', the box-clamps F, and wire $g^3$.

When it is desired to set the head A closer to the commutator, the lock-nut $g^2$ is loosened, so as to loosen the box-clamps F with their corrugated tops, the head A is moved forward by means of the slotted extensions E E' and the lugs $f^2$, the corrugations on box-clamps F and slotted extensions E E' are meshed in the new position, and the whole securely and rigidly fastened, as before. Near the end of said insulator G, opposite to the head A, is formed a slotted opening $g^4$, which is so formed for the purpose of allowing said insulator G, and with it the head A, to be raised or lowered, as may be desired.

In order to attach said brush-holder to the motor, a bracket H is provided with slots $h\,h$ (see Fig. 5) and also provided with a stud $h'$ and box-jaws $h^2$, constructed so as and of proper dimensions to receive and hold the base of the insulator G, as seen in Fig. 2. The stud $h'$ is passed through the slot $g^4$ of the insulator. A clamp $h^3$, provided with a hole therefor, is passed over the stud $h'$ so as to inclose the base of the insulator G between the clamp $h^3$ and the bracket-jaws $h^2$. A spring-lock washer $h^4$ and lock-nut $h^5$ are provided, by means of which the base of said insulator G is firmly and rigidly clamped and held to the bracket H. When it is necessary to raise or lower said brush-holder, the lock-nut $h^5$ is loosened, and said insulator, by means of the slot $g^4$ and stud $h'$, is adjusted to the position desired, and again firmly clamped.

My brush-holder is attached to the lower arm I of the commutator-yoke by means of threaded bolts $i\,i$, Fig. 1, passing through bolt-holes in said arm I and the slots $h\,h$ in said bracket-arms and secured by means of lock-nuts $i'\,i'$ and spring-lock washers $i^2$ and, as will be seen, in a vertical position. It will thus be seen that my brush-holder is adjustable in all directions, as circumstances may require, and is applicable to all sizes and styles of commutator.

It will be seen from the foregoing description that my brush-holder fastens rigidly on the yoke I of the motor and in a vertical position, instead of around the shaft of the motor in a horizontal position, and that the pressure of the tongue C drives the brush straight onto the commutator at right angles to the axis of said commutator and automatically keeps the brush (not herein described or claimed) in contact with the periphery of the commutator K, no matter what may be the size or peculiar shape of the same or the accidents of the service; that my brush-holder is adjustable in all desired directions; is movable to the right or left to suit the end-play of the armature employed, and also up or down to bring the brush to the center or radial line of the commutator or in and out to suit the size of the commutator; that the insulator G, standing in a vertical position, will not hold water, oil, or metal dust, and that the space between the head A of said brush-holder and the metal attachment H at the base of said insulator G is so great that a perfect insulation is obtained, which is not liable to be decreased by any accident of service. It will be seen, also, that the tongue C and spring $b^4$, that hold the brush up to the commutator, can be easily adjusted by the operator to any length of brush, so that an ordinary brush can be almost entirely utilized; that when fitting a new brush the tension can be all taken out, so that the spring $b^4$ may not be strained, the tongue C dropped on the brush, and any desired tension taken up to suit the condition of the commutator, which is indicated at K.

It will also be further seen that by means of my device for fastening the head A of the brush-holder to the insulated part G through corrugated clamps F to fit into and mesh with similar corrugations on slotted extensions E when the bolt G' through the clamps F is drawn tight the head A will not slide forward or back, and the lug $f^2$, fitting in the slot $e'$, will not allow the head to raise out of the clamps, but will allow the head to be slipped back and forth the length of said slots by loosening said bolt and adjusted and held to the desired position. It will also be observed that the contact or terminal wire $g^3$, carrying the current of the armature, is bolted to the brush-holder with the same bolt G' that holds together the clamps F, thus giving a contact through brass to the brush, and does away with all extra bolts or screws for that purpose, and that the tongue C, that presses the brush against the commutator, is curved in such a way as to press equally on the center of the end of the brush, whether long or short, thus giving the spring a full and even pressure on the brush.

I claim—

1. An electrical-brush holder composed of a triangular solid head of brass or other suitable metal, a cross-bolt connecting the apices of the vertical jaws or sides of such head and covered by a sleeve, a ratchet-wheel at one end of said bolt, and a pawl adapted to engage the teeth of said ratchet, a pin passing through said sleeve and bolt midway between the vertical jaws, a swinging plate hung on said bolt, a spiral spring wound around said sleeve with its free ends projecting downward and resting on the side of said swinging plate, and a tongue attached to the bottom of said swinging plate, substantially as and for the purposes described.

2. An electrical-brush holder composed of a triangular solid head of brass or other suitable metal, a cross-bolt connecting the apices of the vertical jaws or sides of such head and covered by a sleeve, a ratchet-wheel at one end of said bolt, and a pawl adapted to engage the teeth of said ratchet, a pin passing through said sleeve and bolt midway between the vertical jaws, a swinging plate hung on said bolt, a spiral spring wound around said sleeve with its free ends projecting downward and resting on the side of said swinging plate, and a tongue attached to the bottom of said swinging plate, in combination with suitable means for attaching said brush-holder to an electrical commutator, the combination being and operating substantially as and for the purposes described.

3. An electrical-brush holder composed of a triangular solid metallic head, a cross or ratchet bolt connecting the apices of the vertical sides of such head, a sleeve covering said bolt, a ratchet-wheel at one end of said bolt, and a pawl pivoted on the side of one of said jaws and adapted to engage the teeth of said ratchet, a pin passing through said sleeve and bolt midway between said vertical sides, a swinging plate hung on said cross-bolt, a spiral spring wound around said sleeve with its free ends projecting and resting on the side of said plate, a tongue attached to the bottom of said plate, an oblong brush-chamber in the bottom of said head and having a portion of its top cut from the back forward to allow the free action of said tongue throughout the length of said brush-chamber, and slotted extensions under the bottom of said head and integral therewith and provided with vertical corrugations along their outer sides, in combination with suitable means for attaching said brush-holder to an electrical commutator, the combination being and operating substantially as and for the purposes described.

4. An electric-brush holder composed of a triangular head adapted to hold a brush in position with a yielding pressure against the periphery of an electrical commutator, slotted extensions under the bottom of said head and parallel with its sides, vertical corrugations on the outer sides of said slotted extensions, a pair of box-clamps with the tops thereof widened and provided with vertical corrugations adapted to mesh and engage the vertical corrugations of said slotted extensions, lugs fitted into the tops of said clamps, extending inwardly and located one side of the center of said clamps and adapted to fit into the slots in said extensions, and a threaded bolt passing through said box-clamps and adapted to bind them firmly together and to said triangular head by means of said extensions, corrugations, and lugs, combined with a means for attaching said brush-holder to the yoke of an electrical commutator, substantially as and for the purposes described.

5. An electrical-brush holder composed of a triangular head adapted to hold a brush in position against the periphery of an electrical commutator and having the described slotted extensions and vertical corrugations, a pair of box-clamps provided with vertical corrugations adapted to mesh and engage the vertical corrugations of said extensions, lugs fitted into the tops of said clamps, extending inwardly and located one side of the center of said clamps and adapted to fit into the slots in said extensions, a threaded bolt passing through said clamps and adapted to bind them firmly together and to said triangular head by means of said extensions, corrugations, and lugs, an insulator of hard maple or other suitable wood, paraffined, as described, adapted to be attached to the bottom of said triangular metal head or holder in a vertical position by means of said corrugated box-clamps and extensions, and a contact wire bolted to the outside of one of said box-clamps by means of the bolt which holds the same together, combined with a means for attaching said brush-holder to the yoke of an electrical commutator, substantially as and for the purposes described.

6. In combination with an electric-brush holder adapted to automatically hold a brush in contact with the perimeter of a commutator, a vertically-adjustable slotted insulator attached thereto and supported in a bracket attached to the yoke of the commutator and having shoulders at its top, and the extensions E E′ on the holder between which the neck g′ of such insulator is fitted, all substantially as and for the purposes set forth.

7. In an electrical-brush holder, a head adapted to automatically hold a brush in contact with the perimeter of a commutator, in combination with a vertical standard or insulator attached thereto, a slot near the base of said insulator, adapted to receive a stud, a bracket with slotted arms adapted to be bolted to the yoke of a commutator and provided with a stud adapted to pass through a slot near the base of said insulator, box-jaws to receive said base, a clamp adapted to inclose the outer side of said insulator, a spring-lock washer and lock-nut fitting the outer end of said stud and adapted to closely and rigidly clamp and bind the base of said insulator to the bracket, and bolts and lock-nuts to attach said bracket to the yoke of an electrical commutator, substantially as and for the purposes described.

8. In electrical-brush holders, a pair of heads adapted to automatically hold a pair of brushes in contact with the opposite sides or poles of an electrical commutator and perpendicular to the axis thereof, corrugated slotted extensions under the bottom of said heads and parallel with the sides thereof, adapted to attach said heads to the standard or insulator, box-clamps with vertical corrugations on their inner sides, and lugs extending inwardly, located to one side of the center of said box-clamps and adapted to engage the said slotted extensions, vertical insulators or standards fastened to said head by means of said clamps, lugs, corrugations, and slotted extensions, and means for attaching the same to the yoke of an electrical commutator, substantially as and for the purpose described.

9. A pair of heads or holders adapted to hold a pair of brushes in contact with the opposite sides or poles of an electrical commutator and at right angles to the axis thereof, slotted extensions, corrugations, lugs, box-clamps, and bolts, as described, for attaching the same to the head of a pair of vertical insulators or standards, combined with a pair of contact or terminal wires bolted to said heads by means of the bolt which holds the parts thereof together, vertical insulators, and brackets and clamps adapted to attach said brush-holders to opposite sides of the yoke of an electrical commutator, substantially as and for the purpose described.

In testimony whereof I have hereunto subscribed my name.

FRANK B. DAGGETT.

Witnesses:
M. I. HUMISTON,
F. J. NEVIN.